April 17, 1951
C. L. GRIMM
2,549,458
WEEDLESS FISH BAIT
Filed July 8, 1947
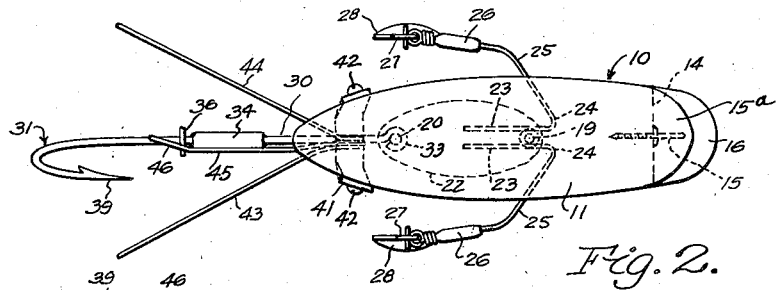
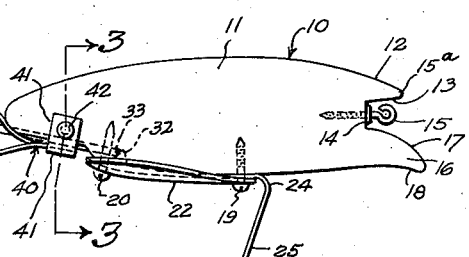
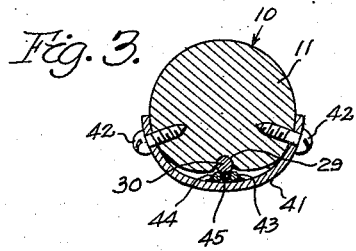
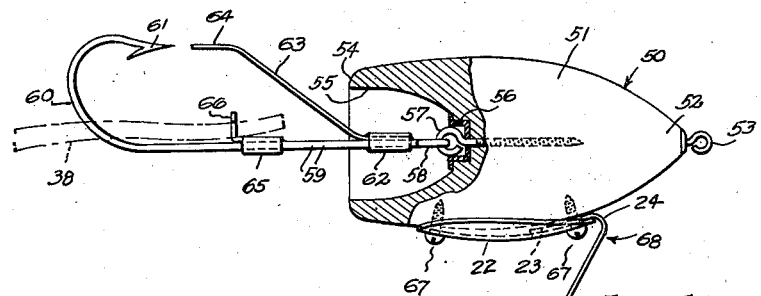
Inventor
Cliel L. Grimm
Barthel & Bugbee
Attorneys Patented Apr. 17, 1951

2,549,458

UNITED STATES PATENT OFFICE 2,549,458

WEEDLESS FISH BAIT

Cliel L. Grimm, Highland Park, Mich.

Application July 8, 1947, Serial No. 759,559

1 Claim. (Cl. 43—42.13)

This invention relates to fishing tackle, and in particular to artificial fish baits of the so-called "plug" type.

One object of this invention is to provide a weedless plug, particularly adapted for use with pork rind strips, thereby increasing the fish luring qualities of the bait.

Another object is to provide a weedless plug which has an improved spoon harness by which fish luring spoons may be attached to the belly of the plug.

Another object is to provide a weedless plug having an improved weed guard which prevents the hook from being entangled with lily pads or weeds as the plug is drawn over them, the weed guard consisting of three wire members attached to an arcuate belly band secured to the plug, two of these wire members being bent downward to serve as skids and the third being bent upward to protect the barb or point of the hook.

Another object is to provide a weedless plug having a blunt, hollowed-out rearward end portion within which the hook is pivotally anchored, the blunt end of the plug not only creating a backwash which attracts fish to the bait but also in itself serving as an additional weed guard to part the weeds just before they encounter the hook, the latter being pivotally anchored within the hollowed-out portion so as to swing to and fro and move out of the way of the weeds.

Another object is to provide a weedless plug wherein the shank of the hook is provided with an improved arrangement for securing the forward end of a pork rind strip, the central portion of which is impaled upon the hook itself, thereby holding the pork rind strip with a double grip.

Another object is to provide a weedless plug wherein the forward end of the plug is notched in a special way with a downwardly-curved lip which enhances the luring action of the bait as it is drawn through the water.

In the drawings:

Figure 1 is a side elevation of a pork rind weedless plug, according to a preferred form of the invention;

Figure 2 is a top plan view of the weedless plug shown in Figure 1;

Figure 3 is a vertical section taken along the line 3—3 in Figure 1 and showing the manner of mounting the weed guards on the body of the plug; and Figure 4 is a side elevation, partly in section, of a modified plug partly broken away to show the hollowed-out rearward portion thereof.

Referring to the drawings in detail, Figures 1 to 3 inclusive show a pork rind weedless plug, generally designated 10, according to a preferred form of the invention as intended to simulate a scorpion in appearance and action. The plug 10 consists of an elongated body 11, preferably of buoyant material, which is approximately cigar-shaped and which has a forward end 12 with a notch 13 therein. The notch 13 has a rearward wall 14 in which a screw eye 15 is mounted for the attachment of the fishing line or leader, usually with the aid of a swivel. The notch 13 results in an upper lip 15a which is directed almost horizontally forward, and a lower lip 16 which is curved downward. The downwardly-curved forward surface 17 of the lower lip 16, cooperating with the downwardly-curved rearward surface 18 thereof, imparts an irregular motion to the plug 10.

Secured as by the fasteners 19 and 20 to the lower surface of the body 11 is a spoon harness, generally designated 21. The latter consists of an approximately oval dished member 22 shaped somewhat like the bowl of a spoon, and closely fitting the underside of the body 11. The member 22 is drilled at its opposite ends to receive the fasteners 19 and 20. Secured as by soldering or welding to the concave or inner surface of the member 22 are the ends 23 (Figures 2 and 3) of wire arms 24, the latter having downwardly, outwardly and rearwardly bent portions 25 terminating in swivels 26. Connected to the swivels 26, as by rings 27 are spoons or flashers 28, these being preferably nickel or chromium plated or made of a material which glitters and flashes as the plug 10 is drawn through the water.

The underside of the body 11 is grooved, as at 29, to receive the shank 30 of a hook 31, a recess 32 being provided for receiving the eye 33 at the forward end of the hook 31. The fastener 20 passes through the eye 33 and thus secures the hook 31 to the body 11. Also secured, as at 34, to the shank 30 of the hook 31 is the shank 35 of an approximately L-shaped pork rind strip holder 36 having a T-head 37 which is inserted through a slot or hole in the forward end of a pork rind strip 38. The barbed point 39 of the hook 31 is inserted through an intermediate slot or hole in the pork rind strip 38, thereby securely holding the latter. The portion 34 may consist of solder or a wire-wrapped connection or any other suitable connecting arrangement.

In order to protect the hook 31 against weeds, a weed guard, generally designated 40, is mounted on the rearward end of the body 11. The weed guard 40 consists of an arcuate band 41 or belly band, which extends transversely around the rearward lower portion of the body 11 and is drilled at its opposite ends to receive the fasteners 42 (Figure 3) by which it is held in engagement with the body 11. Soldered, welded or otherwise secured to the inner surface of the band 41 (Figure 3) are the forward ends of three wire weed guard arms 43, 44 and 45 respectively. The arms 43 and 44 are bent slightly downward, outward and rearward so as to serve as skids diverging on opposite sides of the hook 31 and keeping it above any weeds which may be in the path of the plug 10, as the latter is drawn through the water. The arm 45, however, is bent upward and rearward and terminates in an approximately horizontally bent end portion 46 which extends into close proximity with the hook point 39 and protects the latter from collecting weeds. The arms 43, 44 and 45, however, are formed of resilient wire which is easily pushed out of the way by the mouth of the fish as it strikes at the bait, so that the fish will become impaled upon the hook 31.

In operation the plug 10 simulates the appearance of a scorpion as it is drawn through the water by a line attached to the screw eye 15. The plug 10 may be used either by trolling or by casting, in either use of which the spoons 28 will flash and glitter as the plug 10 is drawn through the water. At the same time, the pork rind 38 will waggle to and fro, causing the fish to strike at it after having been attracted by the splash of the plug hitting the water and the flash of the spoons 28, as well as by the general shape of the body 11.

One of the most likely places for large fish to lurk is in a small open place in an otherwise weed-covered portion of a pond, lake or river. Such fish hide in such places where they can sun themselves and yet feel protected by the surrounding area of lily-pads or weeds. The casting of ordinary baits or plugs into such small open areas is impractical because the hooks thereon become entangled with the weeds or lily-pads the instant the plug is drawn out of the open area and into the weeds or lily-pads while it is being retracted. As a consequence, most fishermen avoid casting their plugs or other bait into these weed-encircled areas.

The present plug 10, however, may be easily and safely cast into such weed-encircled areas and results in a large percentage of strikes from fish lurking in such areas. As the plug 10 is drawn out of the area and into the weeds or lily-pads, the skids 43 and 44 lift the rearward end of the body 11, together with the hook 31 above these weeds, permitting the former to slide safely over the latter without entanglement. At the same time, the arm 45 prevents the point 39 of the hook 31 from being entangled with any portions of the weeds which may extend above the level of the skids 43 and 44.

When the plug 10 has been retracted, the pork rind strip 38 may be instantly and easily replaced. This is done merely by removing any fragments of the previous strip which may remain and attaching a fresh strip by threading the forward hole or slot through the T-headed portion 37 of the holder 36 and threading the point 39 of the hook through the intermediate slot or hole thereof. The plug 10 is then cast again in the usual manner, or drawn through the water by trolling.

The modified plug, generally designated 50, shown in Figure 4 consists of an approximately bullet-shaped body 51 of buoyant material such as wood or plastic and having a tapered forward end 52 with a screw eye 53 mounted therein for the attachment of a fishing line or leader, with or without a swivel. The rearward end 54 of the body 51 is provided with a hollowed out portion or socket 55 somewhat resembling the hollow or recess in the bowl of a tobacco pipe. Mounted in the bottom of the recess 55 is a ferrule 56 which is drilled for the passage of a screw eye 57 seated in the body 51. Mounted on the screw eye 57 is the eye 58 on the forward end of the shank 59 of a hook 60 having a barbed point 61.

Secured as at 62 by soldering or wrapping is the forward end of a wire weed guard arm 63, the rearward end of which is bent as at 64 into close proximity with the point 61. Secured as at 65 to the hook shank 59 is a pork rind strip holder 66 substantially identical with the holder 36 shown in Figures 1 and 2 and used in the same manner. Secured as by the fasteners 67 to the underside of the body 51 is a spoon harness generally designated 68 which is identical with the spoon harness 21 shown in Figures 1 and 2 and which, therefore, has similarly designated parts, including flashers 28.

In operation, the modified plug 50 is attached to the fishing line and a pork rind strip 38 attached to the holder 66 and hook 60 in the manner previously described. The plug 50 is then cast by means of a casting rod or drawn through the water by a trolling line. The fish is attracted first by the splash made by the plug and afterward by the glitter of the spoons 28 and the waggling of the pork rind strip 38. The blunt rearward end 54 of the body 51 creates a backwash, aided by the hollow or recess 55 as the plug moves through the water. This backwash not only assists in attracting the attention of the fish, but also serves to further spread the weeds apart which have been already parted by the body 51. Since the hook 60 is pivotally attached to the screw eye 57, it can move to and fro and thereby avoid other weeds. The weed guard 63, like the weed guard 45, serves to protect the point 61 of the hook 60 against entanglement with other weeds.

Thus either of the plugs 10 or 50 of this invention may be cast into patches of water which are surrounded by weeds or lily pads and retracted by drawing them over such weeds or lily pads without causing the hook to be entangled in these in the majority of cases. The fisherman thus has at his disposal a bait which can be used in areas previously inaccessible to fishermen, and its great success in practice proves its fish-getting qualities as well as its substantially weedless properties. The use of the pork rind strips, for which these plugs are especially adapted, greatly enhances these fish-getting qualities.

In place of the weedless hook and pork rind strip, it is also contemplated that the so-called bucktail weedless hook may be substituted, where the user so desires.

What I claim is:

A weedless plug comprising a body, a support configured to said body and secured therebeneath, a plurality of arms having their inner end portions extending lengthwise along said support and secured substantially along the entire length of said inner end portions to the inner side of said support, the outer portions of said arms emerging at the forward end of said support and extending downwardly, outwardly and rearwardly therefrom, a flasher connected to the outer portion of each arm, and a fish hook connected to said body.

CLIEL L. GRIMM.

REFERENCES CITED

The following references are of record in the file of this patent:

UNITED STATES PATENTS

| Number | Name | Date |
|---|---|---|
| 533,590 | Hastings | Feb. 5, 1895 |
| 871,057 | Davis | Nov. 12, 1907 |
| 1,069,093 | Faught | July 29, 1913 |
| 1,682,710 | Pflueger | Aug. 28, 1928 |
| 1,727,936 | Pflueger | Sept. 10, 1929 |
| 1,890,400 | Miller | Dec. 6, 1932 |
| 1,916,582 | Pflueger | July 4, 1933 |
| 1,948,823 | Lissy | Feb. 27, 1934 |
| 2,079,883 | Valasek | May 11, 1937 |
| 2,103,994 | Verzi | Dec. 28, 1937 |
| 2,203,473 | Shannon | June 4, 1940 |
| 2,236,241 | Wolfe | Mar. 25, 1941 |